US010682867B2

(12) United States Patent
Ohta et al.

(10) Patent No.: US 10,682,867 B2
(45) Date of Patent: Jun. 16, 2020

(54) CARD PROCESSING DEVICE

(71) Applicant: NIDEC SANKYO CORPORATION, Nagano (JP)

(72) Inventors: Keiji Ohta, Nagano (JP); Satoshi Yokoyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/334,998

(22) PCT Filed: Sep. 4, 2017

(86) PCT No.: PCT/JP2017/031718
§ 371 (c)(1),
(2) Date: Mar. 20, 2019

(87) PCT Pub. No.: WO2018/061631
PCT Pub. Date: Apr. 5, 2018

(65) Prior Publication Data
US 2019/0275809 A1 Sep. 12, 2019

(30) Foreign Application Priority Data

Sep. 30, 2016 (JP) ................................ 2016-192738

(51) Int. Cl.
*B41J 3/51* (2006.01)
*B41J 2/33* (2006.01)
(Continued)

(52) U.S. Cl.
CPC ................. *B41J 3/51* (2013.01); *B41J 2/325* (2013.01); *B41J 2/33* (2013.01); *B41J 3/60* (2013.01);
(Continued)

(58) Field of Classification Search
CPC ....... B41J 3/51; B41J 2/325; B41J 2/33; B41J 3/60; B41J 13/12; G06K 13/08; G07F 19/201
See application file for complete search history.

(56) References Cited

U.S. PATENT DOCUMENTS

2003/0164982 A1 9/2003 Lien
2010/0272492 A1* 10/2010 Van Britsom .......... B41J 15/044
400/613
2013/0292061 A1* 11/2013 Tanaka ................. B65H 35/002
156/538

FOREIGN PATENT DOCUMENTS

JP  07089270 A  4/1995
JP  11069269 A  3/1999
(Continued)

OTHER PUBLICATIONS

International Search Report corresponding to Application No. PCT/JP2017/031718; dated Oct. 31, 2017.

*Primary Examiner* — Lamson D Nguyen
(74) *Attorney, Agent, or Firm* — Cantor Colburn LLP (57) ABSTRACT

A card processing device may include a card reader and a printer. The printer may include an ink ribbon cartridge; a thermal head; and a cover member. The ink ribbon cartridge may include a supply roll and a take-up roll. The thermal head may heat the ink ribbon and transfer ink to the card. The card reader may be on a front side of the thermal head, and a part of the card reader may be on a lower side of the supply roll or the take-up roll. The cover member may pivot between a closed position and open position. A conveyance path may be provided inside the card reader and the printer. A part of the conveyance path inside the card reader may be a first conveyance path. The card reader may include an upper frame. The upper frame may pivot between a closed position and open position.

4 Claims, 5 Drawing Sheets

(51) Int. Cl.
  *B41J 3/60*      (2006.01)
  *G06K 13/08*     (2006.01)
  *G07F 19/00*     (2006.01)
  *B41J 2/325*     (2006.01)
  *G06K 13/06*     (2006.01)
  *B41J 13/12*     (2006.01)

(52) U.S. Cl.
  CPC .............. *B41J 13/12* (2013.01); *G06K 13/06* (2013.01); *G06K 13/08* (2013.01); *G07F 19/201* (2013.01)

(56) References Cited

FOREIGN PATENT DOCUMENTS

| | | |
|---|---|---|
| JP | 2000141845 A | 5/2000 |
| JP | 2003104591 A | 4/2003 |
| JP | 2010089300 A | 4/2010 |
| JP | 2014104745 A | 6/2014 |
| JP | 2015161991 A | 9/2015 |
| JP | 2016157369 A | 9/2016 |

* cited by examiner

CARD PROCESSING DEVICE

CROSS REFERENCE TO RELATED APPLICATIONS

This is the U.S. national stage of application No. PCT/JP2017/031718, filed on Sep. 4, 2017. Priority under 35 U.S.C. § 119(a) and 35 U.S.C. § 365(b) is claimed from Japanese Application No. 2016-192738, filed Sep. 30, 2016; the disclosures of which are incorporated herein by reference.

TECHNICAL FIELD

At least an embodiment of the present invention relates to a card processing device that performs predetermined processing on a card.

BACKGROUND

Card issuing devices that issue cards have been proposed (see, for example, Patent Literature 1). The card issuing device described in Patent Literature 1 includes: a card reader that reads data recorded on a card and records data on a card; a card stacker including a card cassette in which cards before issue are stacked and contained, and a card feeding mechanism that feeds the cards contained in the card cassette toward the card reader; and a card collection unit that collects unnecessary cards. The card stacker and the card collection unit overlap in the up-down direction. The card reader is disposed on the front side of the card stacker.

Further, printing devices that print on cards have been proposed (see, for example, Patent Literature 2). The printing device described in Patent Literature 2 includes: an ink ribbon cartridge including a supply roll and a take-up roll around which an ink ribbon is wound; and a main body part in which the ink ribbon cartridge is removably mounted. This printing device includes: a card conveyance mechanism that conveys a card; a thermal head that heats an ink ribbon and transfers ink of the ink ribbon to print on the card; and a ribbon feeding mechanism that feeds the ink ribbon between the supply roll and the take-up roll. The supply roll is disposed on an upper front side of the thermal head, and the take-up roll is disposed on an upper rear side of the thermal head.

PATENT LITERATURE

[Patent Literature 1]
Japanese Unexamined Patent Application Publication No. 2015-161991
[Patent Literature 2]
Japanese Unexamined Patent Application Publication No. 2014-104745

The present inventors study a configuration of a card processing device having both the function of the card reader described in Patent Literature 1 and the function of the printing device described in Patent Literature 2. In order to form such a card processing device, the card reader described in Patent Literature 1 and the printing device described in Patent Literature 2 may be combined in a front-rear direction of the card processing device. However, mere combination of the card reader described in Patent Literature 1 and the printing device described in Patent Literature 2 in the front-rear direction may increase a size of the card processing device in the front-rear direction.

SUMMARY

Therefore, at least an embodiment of the present invention is, in a card processing device including a card reader unit that, for example, reads data recorded on a card and a print unit that prints on a card, to provide a card processing device downsizable in the front-rear direction.

In order to solve the problem above, the card processing device of at least an embodiment of the present invention includes: a card reader unit that performs at least one of reading of data recorded on a card and recording of data on the card; and a print unit that includes an ink ribbon cartridge and a thermal head and prints on the card, including a cover member that covers at least the ink ribbon cartridge from above, wherein the ink ribbon cartridge includes a supply roll on which an ink ribbon is wound, and a take-up roll on which the ink ribbon supplied from the supply roll is wound, the thermal head heats the ink ribbon and transfers ink of the ink ribbon to print on the card, the card reader unit is disposed on a front side of the thermal head in a front-rear direction, and at least a part of the card reader unit is disposed on a lower side of the supply roll or the take-up roll in an up-down direction, the cover member is pivotable between the cover closed position at which the cover member covers the ink ribbon cartridge from above and the cover open position at which the ink ribbon cartridge is exposed, the cover member pivoting with a left-right direction orthogonal to an up-down direction and a front-rear direction being a pivotal axis direction and with the rear end side of the card processing device or the front end side of the card processing device as a pivotal center, inside the card reader unit and the print unit, the conveyance path along which the card is conveyed is formed, when a part of the conveyance path formed inside the card reader unit is a first conveyance path, the card reader unit includes an upper frame that forms an upper surface of the first conveyance path, and the upper frame is pivotable between a frame closed position at which the upper frame forms the first conveyance path and a frame open position at which an upper surface and a lower surface of the first conveyance path are exposed, the upper frame pivoting with a left-right direction being a pivotal axis direction and with the front end side of the card processing device as a pivotal center.

In the card processing device of at least an embodiment of the present invention, at least a part of the card reader unit is disposed on the lower side of the supply roll or the take-up roll that form the print unit. Therefore, in at least an embodiment of the present invention, the card processing device can be downsized in the front-rear direction compared with a case in which the card reader described in Patent Literature 1 and the printing device described in Patent Literature 2 are arranged in mere combination in the front-rear direction of the card processing device.

Further, in at least an embodiment of the present invention, the cover member that covers the ink ribbon cartridge from above can pivot between the cover closed position at which the cover member covers the ink ribbon cartridge from above and the cover open position at which the ink ribbon cartridge is exposed. The cover member pivots with the left-right direction orthogonal to an up-down direction and a front-rear direction being a pivotal axis direction, and with the rear end side of the card processing device or the front end side of the card processing device being a pivotal center. Therefore, in at least an embodiment of the present invention, it is possible to replace the ink ribbon cartridge from above of the card processing device by pivoting the cover member to the cover open position.

Further, in at least an embodiment of the present invention, the card reader unit at least a part of which is disposed on the lower side of the supply roll or the take-up roll includes the upper frame that forms the upper surface of the first conveyance path along which the card is conveyed, and the upper frame can pivot between the frame closed position at which the upper frame forms the first conveyance path and the frame open position at which the upper surface and the lower surface of the first conveyance path are exposed. The upper frame pivots with the left-right direction being a pivotal axis direction, and with the front end side of the card processing device as a pivotal center. Therefore, in at least an embodiment of the present invention, the cover member is pivoted to the cover open position, the ink ribbon cartridge is removed, and the upper frame is pivoted to the frame open position, whereby the entire upper side of the conveyance path of the card reader unit and the print unit can be opened. Therefore, in the present embodiment, maintenance of the card reader unit and the print unit can be easily performed.

Further, in at least an embodiment of the present invention, even if the cover member is pivoted to the cover open position for the replacement of the ink ribbon cartridge and the ink ribbon cartridge is removed, the upper surface and the lower surface of the first conveyance path are not exposed unless the upper frame is pivoted to the frame open position. Therefore, in at least an embodiment of the present invention, security of the card processing device can be increased. That is, in at least an embodiment of the present invention, even if the cover member is pivoted to the cover open position and the ink ribbon cartridge is removed, a magnetic head, for example, disposed to face the first conveyance path is not exposed unless the upper frame is pivoted to the frame open position. Therefore, a possibility that a skimming device for illegally acquiring magnetic data is attached to the magnetic head can be reduced. Therefore, in at least an embodiment of the present invention, security of the card processing device can be increased.

In at least an embodiment of the present invention, the cover member is pivotable around the rear end side of the card processing device. With such a configuration, when, for example, the card processing device is mounted in a host device such as an automated teller machine (ATM), even if the front surface side of the card processing device is in contact with a front surface portion of a housing of the host device, the card processing device can be opened wide while preventing interference between the cover member pivoting toward the cover open position and the front surface portion of the housing of the host device. Therefore, replacement of the ink ribbon cartridge and maintenance of the card reader unit and the print unit can be performed more easily.

In at least an embodiment of the present invention, the card processing device includes a card inverting unit that inverts front/rear of the card and, when the cover member is located at the cover closed position the card inverting unit is covered with the cover member from above. With such a configuration, the card inverting unit can be protected by the cover member located at the cover closed position.

As described above, in at least an embodiment of the present invention, in a card processing device including a card reader unit that, for example, reads data recorded on a card and a print unit that prints on the card, it is possible to downsize a card processing device in a front-rear direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Below, embodiments of the present invention will be described with reference to the drawings.
(Configuration of Card Processing Device)

Figure 1:
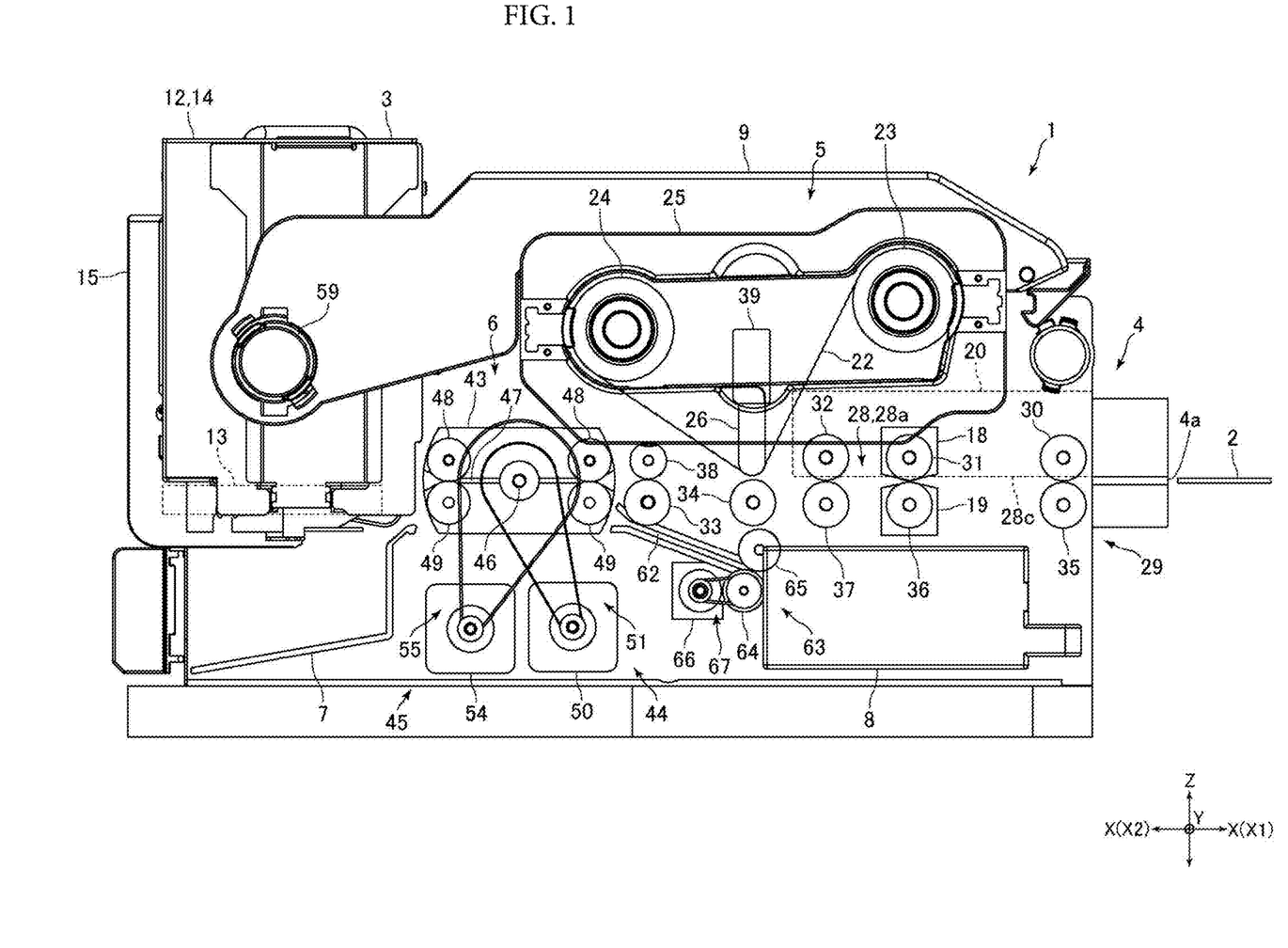
FIG. 1 is a diagram illustrating a schematic configuration of a card processing device according to an embodiment of the present invention viewed from one side.
Figure 2:
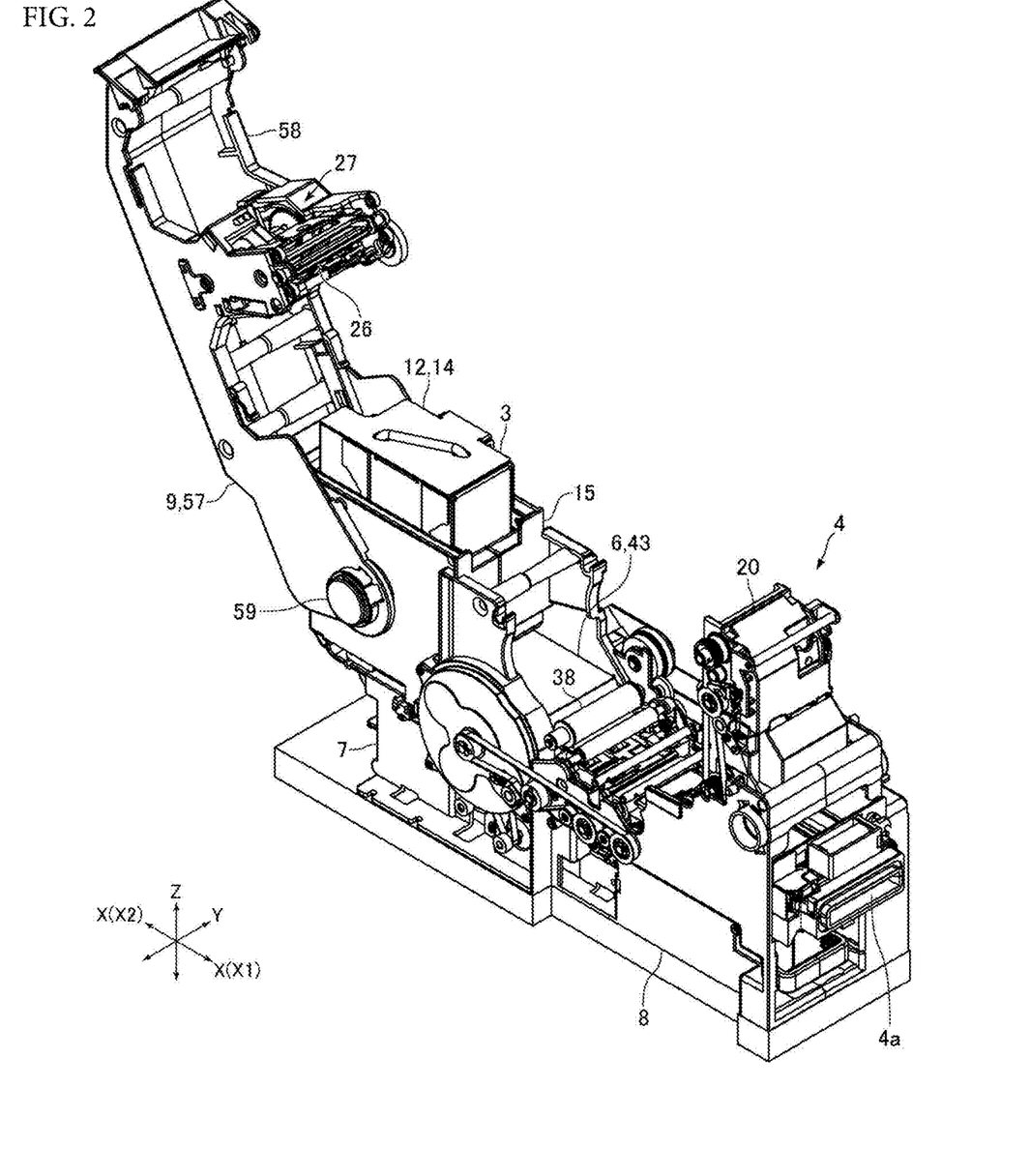
FIG. 2 is a perspective view of the card processing device illustrated in FIG. 1 illustrating a state in which a cover member and an upper frame are opened, and an ink ribbon cartridge is removed.
Figure 3:
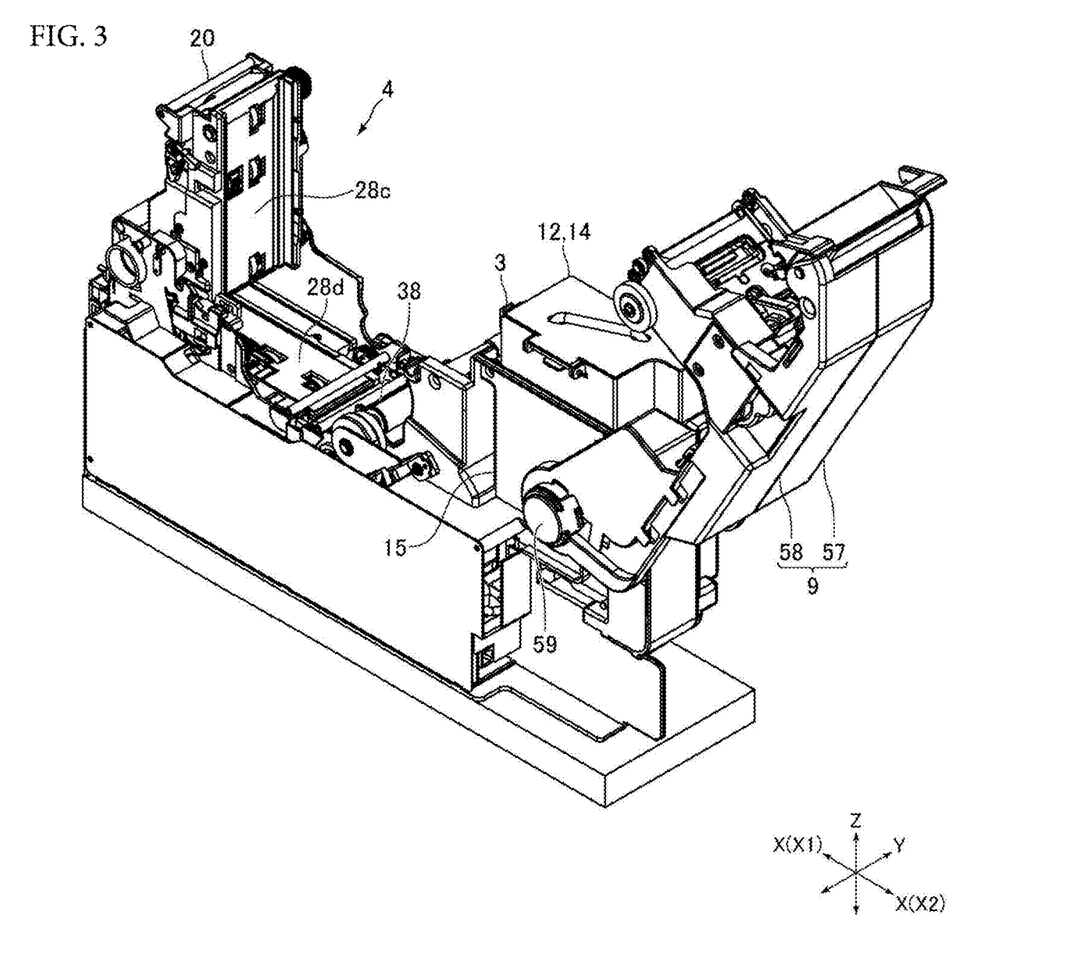
FIG. 3 is a perspective view of the card processing device illustrated in FIG. 2 viewed from a different angle illustrating a state in which the cover member and the upper frame are opened, and the ink ribbon cartridge is removed.

FIG. 1 is a diagram illustrating a schematic configuration of a card processing device 1 according to an embodiment of the present invention viewed from one side. FIG. 2 is a perspective view of the card processing device 1 illustrated in FIG. 1 illustrating a state in which a cover member 9 and an upper frame 20 are opened and an ink ribbon cartridge 25 is removed. FIG. 3 is a perspective view of the card processing device 1 illustrated in FIG. 2 viewed from a different angle illustrating a state in which the cover member 9 and the upper frame 20 are opened and an ink ribbon cartridge 25 is removed. Note that an X direction in FIG. 1 and other drawings is a front-rear direction of the card processing device 1, a Z direction in FIG. 1 and other drawings is an up-down direction of the card processing device 1, and a Y direction in FIG. 1 and other drawings is a left-right direction of the card processing device 1 orthogonal to the front-rear direction and the up-down direction. In addition, an X1 direction side in the front-rear direction is a front side of the card processing device 1, and an X2 direction side that is opposite to the X1 direction side is a rear side of the card processing device 1.

The card processing device 1 of the present embodiment is a card issuing device that issues a new card 2. Therefore, hereinafter, the card processing device 1 of the present embodiment will be referred to as "card issuing device 1." The card issuing device 1 is mounted and used in, for example, an ATM. The card issuing device 1 is mounted in an ATM such that a front end side of the card issuing device 1 is in contact with the front surface portion of the housing of the ATM.

The card issuing device 1 includes a card stack unit 3 in which new cards 2 before issue are contained, a card reader unit 4 that performs at least one of reading of data recorded on the card 2 and recording of data on the card 2, a print unit 5 that prints on the card 2, a card inverting unit 6 that inverts front/rear of the card 2, and two card collection containers 7 and 8 in which the card 2 is collected. Further, the card issuing device 1 includes a cover member 9 that covers a later-described ink ribbon cartridge 25 from above. The ink ribbon cartridge 25 forms a part of the print unit 5. As illustrated in FIG. 1 to FIG. 3, the cover member 9 is openable and closable.

The card 2 is, for example, made of vinyl chloride with a thickness of about 0.7 mm to 0.8 mm, and is substantially rectangular in shape. Magnetic stripes for recording magnetic data are formed, for example, on a surface of the card 2. Further, the card 2 includes a built-in integrated circuit (IC) chip, for example. Note that the card 2 may be made of polyethylene terephthalate (PET) with a thickness of about 0.18 mm to 0.36 mm, or may be made of paper with a predetermined thickness, etc.

The card stack unit 3 includes a card containing part 12 in which the cards 2 before issue are stacked and contained, and a card feeding mechanism 13 that feeds the lowermost one of the cards 2 in the card containing part 12. The card containing part 12 includes a card cassette 14 in which the card 2 is contained, and a main body part 15 in which the card cassette 14 is removably mounted. The card feeding mechanism 13 is disposed on the lower side of the card containing part 12 and overlaps the card containing part 12 in the up-down direction. The card feeding mechanism 13 includes, for example, a feeding claw (not illustrated) that engages the lowermost one of the cards 2 in the card containing part 12 and feeds the card 2 to the outside of the card containing part 12, and a claw feeding mechanism (not illustrated) that moves the feeding claw. The card feeding mechanism 13 feeds the card 2 contained in the card containing part 12 toward the front side.

The card reader unit 4 includes magnetic heads 18 and 19 that reads magnetic data recorded on the card 2 and recording magnetic data on the card 2. In a case in which the card 2 is a contact-type IC card, the card reader unit 4 is provided with an IC contact spring (not illustrated) that is in contact with an external connection terminal of the IC chip of the card 2. In a case in which the card 2 is a non-contact type IC card, the card reader unit 4 is provided with an antenna (not illustrated) for communicating with an antenna of the card 2 in a non-contact manner. Further, the card reader unit 4 includes an upper frame 20 that forms an upper surface of a part of a later-described conveyance path 28 formed inside the card reader unit 4 and the print unit 5. An insertion/ejection port 4a of the card 2 is formed at a front end of the card reader unit 4. Note that if no magnetic stripes are formed on a surface of the card 2, the card reader unit 4 does not necessarily have to include the magnetic heads 18 and 19.

The print unit 5 includes an ink ribbon cartridge 25 that includes a supply roll 23 on which the ink ribbon 22 is wound and a take-up roll 24 on which the ink ribbon 22 supplied from the supply roll 23 is taken up, the thermal head 26 that heats the ink ribbon 22 and transfers ink of the ink ribbon 22 to print on the card 2, a head lift mechanism 27 (see FIG. 2) that raises and lowers the thermal head 26, and a ribbon feeding mechanism (not illustrated) that feeds the ink ribbon 22 from the supply roll 23 to the take-up roll 24. The ink ribbon cartridge 25 is removable from a main body frame of the card issuing device 1. Note that the head lift mechanism 27 is omitted from FIG. 1.

Inside the card reader unit 4 and the print unit 5, the conveyance path 28 along which the card 2 is conveyed is formed. The conveyance path 28 includes a part formed inside the card reader unit 4 and a part formed inside the print unit 5. In the following description, a part of the conveyance path 28 formed inside the card reader unit 4 is referred to as a first conveyance path 28a.

The card reader unit 4 and the print unit 5 are provided with a card conveyance mechanism 29 that conveys the card 2 in the conveyance path 28. The card conveyance mechanism 29 includes three drive rollers 30, 31, and 32 that form a part of the card reader unit 4, and a drive roller 33 and a platen roller 34 that form a part of the print unit 5. The card conveyance mechanism 29 conveys the card 2 in the front-rear direction. A common driving source (more specifically, an unillustrated motor) is connected to the drive rollers 30 to 33 and the platen roller 34 via a power transmission mechanism (not illustrated).

The drive rollers 30 to 32 are arranged to face the conveyance path 28 from above. More specifically, the drive rollers 30 to 32 are arranged to face the first conveyance path 28a from above. Further, the drive rollers 30, 31, and 32 are arranged from the front side toward the rear side in this order and at predetermined intervals. Pad rollers 35, 36, and 37 are arranged to face the drive rollers 30, 31, and 32, respectively. The pad rollers 35 to 37 are arranged to face the conveyance path 28 from below (more specifically, to face the first conveyance path 28a from below).

The drive roller 33 and the platen roller 34 are arranged to face the conveyance path 28 from below. The platen roller 34 is located on the rear side of the drive roller 32. The drive roller 33 is located on the rear side of the platen roller 34. A cleaning roller 38 that removes dust and the like adhering to a surface of the card 2 before printing is disposed to face the drive roller 33. The cleaning roller 38 is disposed to face the conveyance path 28 from above. The platen roller 34 is disposed immediately below the thermal head 26.

A magnetic head 18 is disposed to face the conveyance path 28 from above, and a magnetic head 19 is disposed to face the conveyance path 28 from below. More specifically, the magnetic head 18 is disposed to face the first conveyance path 28a from above, and the magnetic head 19 is disposed to face the first conveyance path 28a from below. The magnetic heads 18 and 19 are disposed at the same positions as the drive roller 31 and the pad roller 36 in the front-rear direction. The upper frame 20 of the card reader unit 4 forms an upper surface 28c of the first conveyance path 28a. The upper frame 20 is openable and closable and is pivotable with the left-right direction being a pivotal axis direction.

The thermal head 26 is held by a head holding member 39. The thermal head 26, the head lift mechanism 27, and the head holding member 39 are attached to the cover member 9. The thermal head 26 can be in contact with the card 2 from above via the ink ribbon 22. When the cover member 9 is closed (a state illustrated in FIG. 1), the thermal head 26 is located between the supply roll 23 and the take-up roll 24 in the front-rear direction. In the present embodiment, the supply roll 23 is disposed on the front side of the thermal head 26, and the take-up roll 24 is disposed on the rear side of the thermal head 26. Further, when the cover member 9 is closed, the supply roll 23 and the take-up roll 24 are located on the upper side of the thermal head 26.

The card inverting unit 6 includes a card holding part 43 that temporarily holds the card 2 therein, a card drawing and feeding mechanism 44 that draws the card 2 into the card holding part 43 and feeds the card 2 out of the card holding part 43, and a rotating mechanism 45 that rotates the card holding part 43 with the left-right direction being a rotational axis direction. The card holding part 43 is formed in a substantially rectangular parallelepiped block shape. The shape of the card holding part 43 when viewed from the left-right direction is substantially rectangle. A width in the longitudinal direction of the card holding part 43 when viewed from the left-right direction is greater than a width in the longitudinal direction of the card 2 that is substantially rectangular in shape.

The card holding part 43 is rotatably supported by a support shaft 46. The support shaft 46 is disposed such that an axis direction of the support shaft 46 matches the left-right direction. The support shaft 46 supports a central part of the card holding part 43 that is substantially rectangular in shape when viewed from the left-right direction. Inside of the card holding part 43, a conveyance path 47 that conveys the card 2 is formed.

The conveyance path 47 is formed at a center position in the transverse direction of the card holding part 43 that is substantially rectangular in shape when viewed from the left-right direction, and is linear in shape along the longitudinal direction of the card holding part 43. The conveyance path 47 is disposed at the same position as the conveyance path 28 in the left-right direction. Further, the conveyance path 47 is disposed at the same position as a card feeding port of the card stack unit 3 in the left-right direction. The card 2 temporarily held inside the card holding part 43 is placed in the conveyance path 47 in a state nipped between two drive rollers 48 and two pad rollers 49 which will be described below.

The card drawing and feeding mechanism 44 includes the two drive rollers 48 arranged on both end sides of the conveyance path 47, the two pad rollers 49 each of which is disposed to face each of the two drive rollers 48, a motor 50 that rotates the drive rollers 48, and a power transmission mechanism 51 that transmits the power of the motor 50 to the drive rollers 48. The card drawing and feeding mechanism 44 conveys the card 2 in the longitudinal direction of the card holding part 43 when viewed from the left-right direction. The drive rollers 48 are arranged to face the conveyance path 47 from one side in the thickness direction of the card 2 passing through the conveyance path 47, and the pad rollers 49 are arranged to face the conveyance path 47 from the other side in the thickness direction of the card 2 passing through the conveyance path 47. The power transmission mechanism 51 includes a pulley, a belt, a gear train, and the like.

The rotating mechanism 45 is formed by a motor 54 that rotates the card holding part 43 around the support shaft 46, and a power transmission mechanism 55 that transmits the power of the motor 54 to the card holding part 43. The power transmission mechanism 55 includes a pulley, a belt, and the like. The motors 50 and 54 are arranged below the card holding part 43.

As illustrated in FIG. 1, the card stack unit 3, the card inverting unit 6, the thermal head 26, and the card reader unit 4 are arranged in this order in the front-rear direction. More specifically, when the cover member 9 is closed (a state illustrated in FIG. 1), the card stack unit 3, the card inverting unit 6, the thermal head 26, and the card reader unit 4 are arranged in this order from the rear side to the front side. That is, the card reader unit 4 is located on the front side of the thermal head 26.

Further, the card inverting unit 6 is located on the rear side of the drive roller 33 and the cleaning roller 38. Further, the rear end side portion of the card reader unit 4 is disposed on the lower side of the supply roll 23 (that is, the lower side of the ink ribbon cartridge 25). Further, in a state in which the conveyance path 47 is parallel to the front-rear direction when viewed from the left-right direction (that is, the state illustrated in FIG. 1), the front end side portion of the card inverting unit 6 is located on the lower side of the take-up roll 24 (that is, the lower side of the ink ribbon cartridge 25).

The cover member 9 is formed by a first cover member 57 and a second cover member 58 as dividing the cover member 9 into two in the left-right direction. The cover member 9 covers the print unit 5 and the card inverting unit 6 from above. That is, the cover member 9 covers the ink ribbon cartridge 25 from above. As described above, the cover member 9 is openable and closable, and is pivotable with the left-right direction being the pivotal axis direction. Further, the cover member 9 is pivotable around the rear end side of the card issuing device 1. More specifically, the cover member 9 is supported by a support shaft 59 fixed at both left and right side surfaces of a main body part 15 of the card stack unit 3, and can be rotated around the support shaft 59 as a pivotal center.

The cover member 9 can pivot between a cover closed position at which the cover member 9 covers the ink ribbon cartridge 25 from above (position illustrated in FIG. 1, position at which the cover member 9 is closed), and a cover open position at which the ink ribbon cartridge 25 is exposed (positions illustrated in FIGS. 2 and 3, position at which the cover member 9 is opened). In the present embodiment, the cover member 9 pivots about 135 degrees between the cover closed position and the cover open position.

When the cover member 9 is located at the cover open position, the entire ink ribbon cartridge 25 is exposed. Therefore, the ink ribbon cartridge 25 can be removed upward from the card issuing device 1 and the ink ribbon cartridge 25 can be attached to the card issuing device 1 from above. That is, when the cover member 9 is located at the cover open position, the ink ribbon cartridge 25 can be replaced from above of the card issuing device 1.

When the ink ribbon cartridge 25 is removed when the cover member 9 is located at the cover open position, the drive roller 33, the platen roller 34, and the cleaning roller 38 are exposed. When the cover member 9 is located at the cover open position, a part of the rear end side of the card holding part 43 is exposed, and when the ink ribbon cartridge 25 is removed in this state, the entire card holding part 43 is exposed. When the cover member 9 is located at the cover closed position, the card holding part 43 is covered with the cover member 9 from above. That is, when the cover member 9 is located at the cover closed position, the inverting unit 6 is covered with the cover member 9 from above.

As described above, the upper frame 20 of the card reader unit 4 is pivotable with the left-right direction being the pivotal axis direction. The upper frame 20 is pivotable around the front end side of the card issuing device 1 as a pivotal center. In addition, the upper frame 20 can pivot between a frame closed position at which the upper frame 20 forms the first conveyance path 28a (i.e., position illustrated in FIG. 1 at which the first conveyance path 28a is formed by the upper frame 20, position at which the upper frame 20 is closed), and a frame open position at which an upper surface 28c and a lower surface 28d of the first conveyance path 28a (see FIG. 3) are exposed (positions illustrated in FIGS. 2 and 3, position at which the upper frame 20 is open).

In the present embodiment, the upper frame 20 pivots about 90 degrees between the frame closed position and the frame open position. Further, in the present embodiment, as described above, the rear end portion of the card reader unit 4 is disposed on the lower side of the ink ribbon cartridge 25, and when the cover member 9 is located at the cover open position and the ink ribbon cartridge 25 is removed, the upper frame 20 located at the frame closed position can be pivoted to the frame open position.

A card collection container 7 is disposed on the lower side of the card stack unit 3 and is disposed lower rear side of the card holding part 43. A card collection container 8 is disposed on the lower side of the card reader unit 4 and is disposed lower front side of the card holding part 43. The card collection containers 7 and 8 are arranged at the same position as the card holding part 43 in the left-right direction. Between the card holding part 43 and the card collection container 8, a conveyance path 62 for the card 2 is formed. The conveyance path 62 is disposed at the same position as the card holding part 43 in the left-right direction. A to-be-collected card conveyance mechanism 63 that conveys the card 2 is disposed in the conveyance path 62.

The to-be-collected card conveyance mechanism 63 includes a drive roller 64, a pad roller 65 disposed to face the drive roller 64, a motor 66 that rotates the drive roller 64, and a power transmission mechanism 67 that transmits power of the motor 66 to the drive roller 64. The drive roller 64 is disposed to face the conveyance path 62 from below, and the pad roller 65 is disposed to face the conveyance path 62 from above. The power transmission mechanism 55 includes a pulley, a belt, and the like.

In the present embodiment, when the card holding part 43 is rotated around the support shaft 46, the conveyance path of the card 2 is switched among a first conveyance path in which the card 2 is conveyed from the card holding part 43 toward the card reader unit 4, a second conveyance path in which the card 2 is conveyed from the card holding part 43 toward the card collection container 7 (see FIG. 2), and a third conveyance path in which the card 2 is conveyed from the card holding part 43 toward the card collection container 8 (see FIG. 3).

(Operation of Card Issuing Device)

Figure 4:
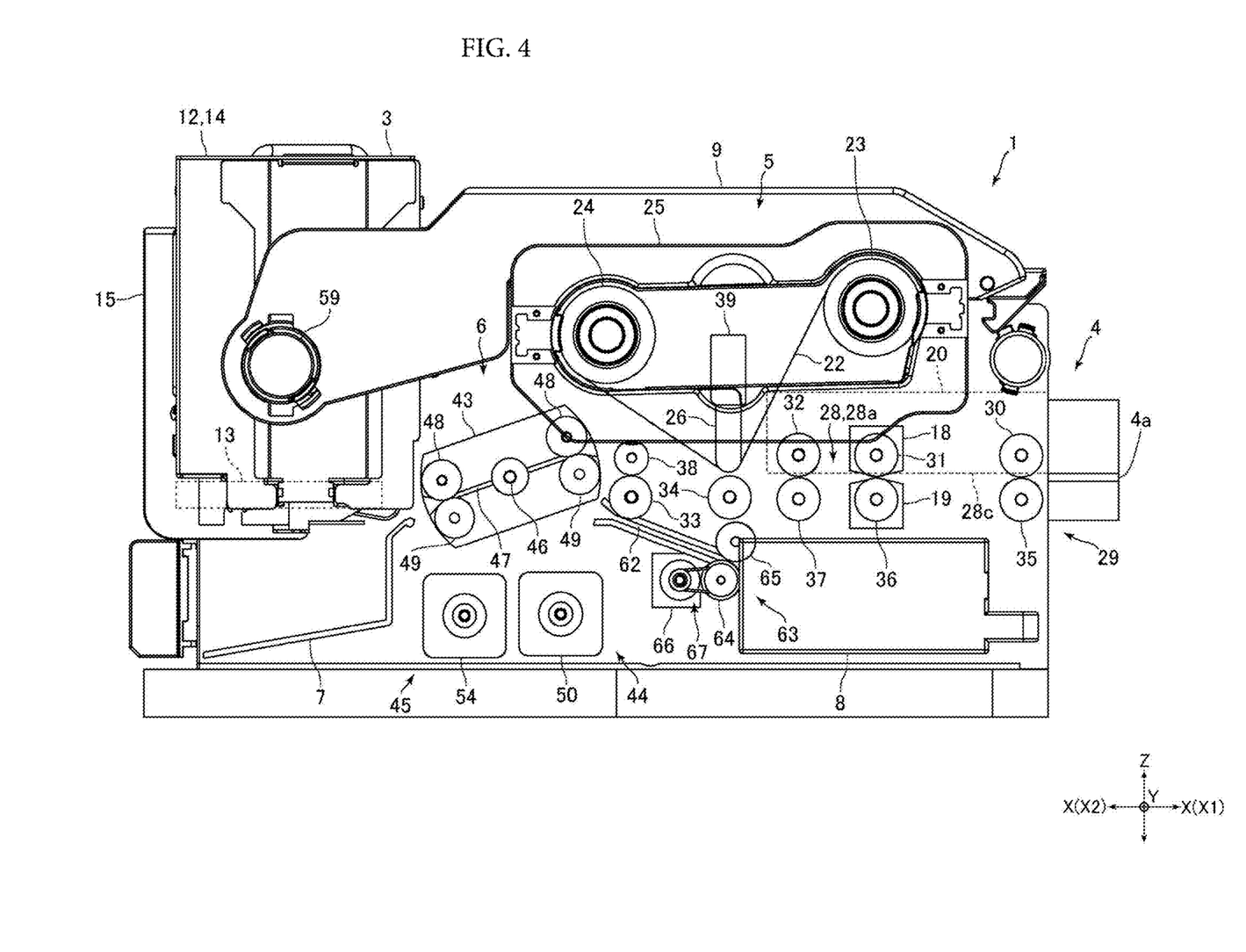
FIG. 4 is a diagram illustrating a state when a card is collected in a card collection container in the card processing device illustrated in FIG. 1.
Figure 5:
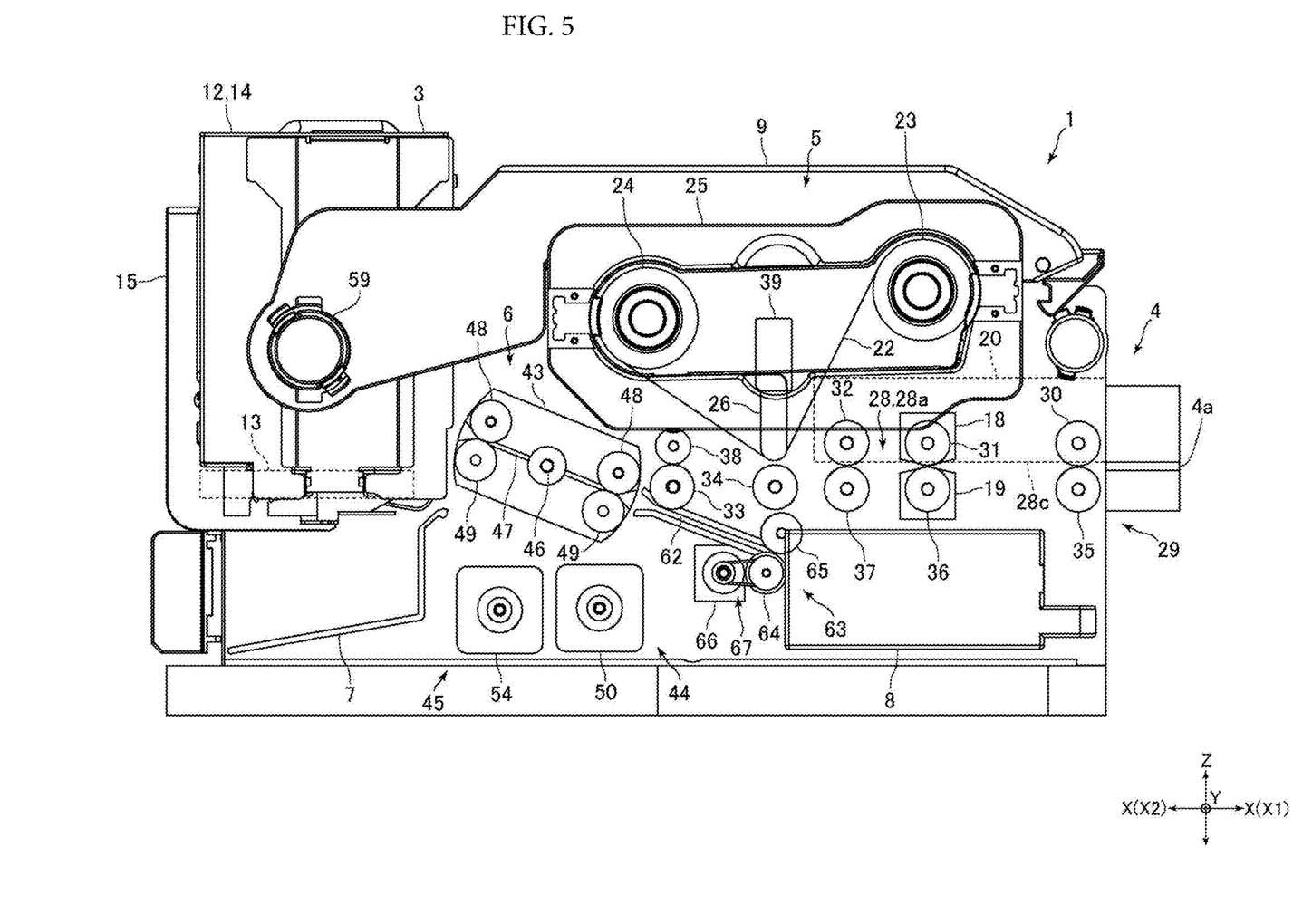
FIG. 5 is a diagram illustrating a state when a card is collected in a card collection container in the card processing device illustrated in FIG. 1.

FIG. 4 is a diagram illustrating a state when the card 2 is collected in the card collection container 7 in the card issuing device 1 illustrated in FIG. 1. FIG. 5 is a diagram illustrating a state when the card 2 is collected in the card collection container 8 in the card issuing device 1 illustrated in FIG. 1.

As described above, the card issuing device 1 is mounted in an ATM. When cash is to be withdrawn or transferred in the ATM, the card reader unit 4 performs predetermined processing on the card 2 inserted from the insertion/ejection port 4a, and then ejects the card 2 from the insertion/ejection port 4a.

When the card 2 is to be newly issued from the ATM, the card stack unit 3 feeds the card 2 in a state in which the conveyance path 47 is parallel to the front-rear direction such that the card 2 is conveyed from the card stack unit 3 to the card holding part 43, and conveyed from the card holding part 43 to the card reader unit 4 as illustrated in FIG. 1. When the card 2 is fed out of the card stack unit 3, the card drawing and feeding mechanism 44 and the card conveyance mechanism 29 convey the card 2 to the front side to a position at which a rear end of the card 2 is located on the front side of the thermal head 26. When the card 2 is conveyed to a position at which the rear end of the card 2 is located on the front side of the thermal head 26, a front surface (upper surface) of the card 2 is cleaned by an action of the cleaning roller 38.

Thereafter, as the thermal head 26 is lowered, the card conveyance mechanism 29 conveys the card 2 to the rear side, and the thermal head 26 prints text and the like on the front surface of the card 2. Thereafter, when printing is to be performed on the back side of the card 2, the card drawing and feeding mechanism 44 and the card conveyance mechanism 29 convey the card 2 until the card 2 is held inside the card holding part 43. After the card holding part 43 is rotated 180 degrees to invert the card 2, the card drawing and feeding mechanism 44 and the card conveyance mechanism 29 convey the card 2 to the front side to a position at which the rear end of the card 2 is located on the front side of the thermal head 26. When the card 2 is conveyed to a position at which the rear end of the card 2 is located on the front side of the thermal head 26, a back surface of the card 2 is cleaned by an action of the cleaning roller 38. Thereafter, while the card conveyance mechanism 29 conveys the card 2 to the rear side, the thermal head 26 prints text or the like on the back side of the card 2.

When the printing on the card 2 is completed, the card reader unit 4 performs predetermined processing such as recording magnetic data on the card 2, and then issues the card 2 from the insertion/ejection port 4a. Here, if a predetermined error occurs during processing in the card reader unit 4, the card conveyance mechanism 29 and the card drawing and feeding mechanism 44 convey the card 2 to the rear side until the card 2 on which the error has occurred is held inside the card holding part 43. Thereafter, as illustrated in FIG. 2, after the card holding part 43 is rotated such that the card 2 is to be conveyed from the card holding part 43 to the card collection container 7, the card drawing and feeding mechanism 44 conveys the card 2 toward the card collection container 7, and the card 2 is collected in the card collection container 7.

When the card 2 is updated to a new card 2 in the ATM, until the used card 2 inserted from the insertion/ejection port 4a is held in the card holding part 43, the card conveyance mechanism 29 and the card drawing and feeding mechanism 44 first convey the card 2. Thereafter, as illustrated in FIG. 3, after the card holding part 43 is rotated such that the card 2 is to be conveyed from the card holding part 43 to the card collection container 8, the card drawing and feeding mechanism 44 feeds the card 2 to the conveyance path 62. The to-be-collected card conveyance mechanism 63 holds the card 2 fed out to the conveyance path 62 between the drive roller 64 and the pad roller 65.

When the card 2 is fed to the conveyance path 62, the card 2 is conveyed from the card stack unit 3 to the card holding part 43, and the card holding part 43 is rotated such that the card 2 is conveyed from the card holding part 43 to the card reader unit 4. Thereafter, as described above, after the thermal head 26 prints text or the like on the new card 2 fed by the card stack unit 3, the card reader unit 4 performs predetermined processing and the card 2 is issued from the insertion/ejection port 4a.

When the card 2 is issued from the insertion/ejection port 4a, the to-be-collected card conveyance mechanism 63 conveys the card 2 held between the drive roller 64 and the pad roller 65 toward the card collection container 8, and the used card 2 is collected in the collection container 8. If an error occurs during issuance of a new card 2 and the card 2 held between the drive roller 64 and the pad roller 65 needs to be returned to a user, the to-be-collected card conveyance mechanism 63 and the card drawing and feeding mechanism 44 convey this card 2 until this card 2 is held inside the card holding part 43. Thereafter, after the card holding part 43 is rotated such that the card 2 is conveyed from the card holding part 43 to the card reader unit 4, the card drawing and feeding mechanism 44 and the card conveyance mechanism 29 convey the card 2, and the card 2 is ejected from the insertion/ejection port 4a.

Main Effect of Present Embodiment

As described above, in the present embodiment, the rear end side portion of the card reader unit 4 is disposed on the lower side of the supply roll 23. Therefore, in the present embodiment, the card issuing device 1 can be downsized in the front-rear direction compared with the case as described above in which the card reader described in Patent Literature 1 and the printing device described in Patent Literature 2 are arranged in mere combination in the front-rear direction.

In the present embodiment, the cover member 9 can pivot between the cover closed position at which the cover member 9 covers the ink ribbon cartridge 25 from above and a cover open position at which the ink ribbon cartridge 25 is exposed. When the cover member 9 is at the cover open position, the entire ink ribbon cartridge 25 is exposed. Therefore, in the present embodiment, as described above, when the cover member 9 is located at the cover open position, the ink ribbon cartridge 25 can be replaced from above of the card issuing device 1.

In the present embodiment, when the cover member 9 is pivoted to the cover open position and the ink ribbon cartridge 25 is removed, the drive roller 33, the platen roller 34, and the cleaning roller 38 are exposed. Further, in the present embodiment, when the cover member 9 is pivoted to the cover open position and the ink ribbon cartridge 25 is removed, the upper frame 20 can be pivoted to the frame open position at which the upper surface 28c and the lower surface 28d of the first conveyance path 28a are exposed. Therefore, in the present embodiment, when the cover member 9 is pivoted to the cover open position, the ink ribbon cartridge 25 is removed, and the upper frame 20 is pivoted to the frame open position, the entire upper side of the conveyance path 28 can be opened. Therefore, in the present embodiment, maintenance of the card reader unit 4 and the print unit 5 can be easily performed.

Further, in the present embodiment, even if the cover member 9 is pivoted to the cover open position for the replacement of the ink ribbon cartridge 25 and the ink ribbon cartridge 25 is removed, the upper surface 28c and the lower surface 28d of the first conveyance path 28a are not exposed unless the upper frame 20 is pivoted to the frame open position. Therefore, in the present embodiment, security of the card issuing device 1 can be increased. That is, in the present embodiment, even if the cover member 9 is pivoted to the cover open position and the ink ribbon cartridge 25 is removed, the magnetic heads 18 and 18 arranged to face the first conveyance path 28a are not exposed unless the upper frame 20 is pivoted to the frame open position. Therefore, it is possible to reduce possibility that a skimming device for illegally acquiring magnetic data is attached to the magnetic heads 18 and 19. Therefore, in the present embodiment, security of the card issuing device 1 can be increased.

In the present embodiment, the cover member 9 is pivotable around the rear end side of the card issuing device 1 as a pivotal center. Therefore, in the present embodiment, even if the card issuing device 1 is mounted in the ATM such that the front end side of the card issuing device 1 is in contact with the front surface portion of the housing of the ATM, the cover member 9 pivoting toward the cover opening position does not interfere with the front surface portion of the housing of the ATM. Therefore, in the present embodiment, it is possible to widely open the cover member 9. As a result, replacement of the ink ribbon cartridge 25 and maintenance of the card reader unit 4 and the print unit 5 can be performed more easily.

In the present embodiment, when the cover member 9 is located at the cover closed position, the card inverting unit 6 is covered with the cover member 9 from above. Therefore, in the present embodiment, the card inverting unit 6 can be protected by the cover member 9 located at the cover closed position. Further, in the present embodiment, when the ink ribbon cartridge 25 is removed when the cover member 9 is located at the cover open position, the entire card holding part 43 is exposed. Therefore, maintenance of the card holding part 43 can be easily performed while the card inverting unit 6 can be protected by the cover member 9.

Other Embodiments

The embodiment described above is one example of an embodiment of the present invention, but the invention is not limited to this. Various modified embodiments are possible without departing from the scope of the present invention.

In the present embodiment described above, the cover member 9 is pivotable around the rear end side of the card issuing device 1 as a pivotal center. However, the cover member 9 may be pivotable around the front end side of the card issuing device 1 if the front surface portion of the housing of the ATM does not interfere with the cover member 9 when the cover member 9 is pivoted to the cover open position. For example, also when the card issuing device 1 is used alone, not being mounted in an ATM, the cover member 9 may be pivotable around the front end side of the card issuing device 1.

In the embodiment described above, the card issuing device 1 is mounted in an ATM. However, the card issuing device 1 may be mounted in a higher-level device other than an ATM. Further, in the embodiment described above, the card issuing device 1 does not necessarily have to include the card inverting unit 6. In the embodiment described above, the card processing device 1 is a card issuing device. However, the card processing device 1 may be a device that performs predetermined processing on the card 2, other than a card issuing device. In this case, for example, the card processing device 1 includes no card stack unit 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card processing device for use with a card, the card processing device comprising:
   a card reader unit structured to perform at least one of reading of data recorded on the card and recording of data on the card; and
   a print unit comprising:
      an ink ribbon cartridge;
      a thermal head structured to print on the card; and
      a cover member that covers at least the ink ribbon cartridge from above, wherein
   the ink ribbon cartridge comprises a supply roll on which an ink ribbon is wound, and a take-up roll on which the ink ribbon supplied from the supply roll is wound,
   the thermal head is structured to heat the ink ribbon and transfer ink of the ink ribbon to print on the card,
   the card reader unit is disposed on a front side of the thermal head in a front-rear direction, and at least a part of the card reader unit is disposed on a lower side of the supply roll or the take-up roll in an up-down direction,
   the cover member is structured to pivot between a cover closed position at which the cover member covers the ink ribbon cartridge from above and a cover open position at which the ink ribbon cartridge is exposed, the cover member pivoting with a left-right direction orthogonal to an up-down direction and a front-rear direction being a pivotal axis direction and with the rear end side of the card processing device or the front end side of the card processing device as a pivotal center, a conveyance path along which the card is conveyed is provided inside the card reader unit and the print unit, a part of the conveyance path provided inside the card reader unit is a first conveyance path, the card reader unit comprises an upper frame that forms an upper surface of the first conveyance path, and the upper frame is structured to pivot between a frame closed position at which the upper frame forms the first conveyance path and a frame open position at which an upper surface and a lower surface of the first conveyance path are exposed, the upper frame pivoting with a left-right direction being a pivotal axis direction and with the front end side of the card processing device as a pivotal center.

2. The card processing device according to claim 1, wherein the cover member structured to pivot around a rear end side of the card processing device as a pivotal center.

3. The card processing device according to claim 1, comprising a card inverting unit structured to invert front/rear of the card, wherein when the cover member is located at the cover closed position, the card inverting unit is covered with the cover member from above.

4. The card processing device according to claim 2, comprising a card inverting unit structured to invert front/rear of the card, wherein when the cover member is located at the cover closed position, the card inverting unit is covered with the cover member from above.

* * * * *